3,171,811
WELL DRILLING FLUIDS
Karl F. Keirstead, Sillery, Quebec, Quebec, and William E. Paton, St. Foye, Quebec, Quebec, Canada, assignors to Lignosol Chemical Limited, Quebec, Quebec, Canada
No Drawing. Filed Dec. 8, 1961, Ser. No. 158,119
3 Claims. (Cl. 252—8.5)

This invention relates to a dispersant for aqueous clay slurries and to a well drilling fluid incorporating such dispersant. This application is a continuation in part of application Serial Number 842,230, filed September 25, 1959, now abandoned.

In the drilling of deep wells, as for example oil or gas walls, a drilling fluid or mud is usually used. This fluid, which is pumped down the inside of the drill pipe and returns upward in the annulus between the drill pipe and the hole, serves several purposes. It acts as a cooling medium and lubricant for the drill bit and as medium for the transport of drill cuttings to the surface, and it produces a sealing layer on the wall of the hole. The fluid normally consists of a suspension in water of a swelling or hydrateable clay, such as bentonite, together with such clay or finely divided material as may be produced from the soil in the course of drilling. Other materials may also be added, such as weighting materials where high pressures may be encountered, starches or gums to promote the wall sealing properties of the fluid, as well as a number of other materials which are used to produce fluids for use under special conditions.

Because of its function in removing the cuttings from the hole it is necessary that the viscosity of the fluid fall within a definite range. The viscosity of the fluid should be high enough to support the cuttings in their travel from the drill bit to the surface, but should not be so high as to make circulation difficult and develop unduly high pressures in the pumping system. At the same time the strength of the gel which develops on standing should be high enough to prevent settling of the cuttings in the well in the event that circulation should be stopped for any reason, but the gel should not develop fast enough to prevent settling and removal of the cuttings in the mud pit. Furthermore the gel should not develop to a point where difficulties are encountered on the resumption of pumping.

Many attempts have been made in the past to achieve the desired mud characteristics as by adding a dispersant, conditioner or thinner to the aqueous clay slurry base to obtain satisfactory viscosity and gel strength. Dispersants containing lignin sulphonates produced from sulphite liquors have been proposed. However, optimum results using such dispersants are difficult to obtain in a uniform manner.

Sodium bentonite muds have little resistance to contamination by salt and anhydrite. Lime muds, produced by conversion of sodium bentonite to calcium bentonite, show some improvement in this respect. The conversion is carried out by the addition of sodium hydroxide and calcium hydroxide usually in proportions of about two to five pounds per barrel respectively.

Lime muds have certain disadvantages where contamination is excessive and where high bottom temperatures are encountered. Lime muds normally show a pH of about 12.5 and are consequently subject to solidification at high temperatures. Under these circumstances, it is found desirable to use gypsum muds. These are prepared from sodium muds by the addition of three to five pounds per barrel of calcium sulphate with subsequent adjustment of the pH to a suitable range, usually 8 to 8.5. Gypsum muds are little affected by anhydrite contamination since they are already saturated with respect to calcium sulphate. They are much more resistant to salt contamination and their lower pH makes them less subject to high temperature solidification. Gypsum muds, however, have been at a disadvantage in that high viscosities and gels have not responded satisfactorily to known lignosulphonate or other thinners.

An object of the present invention is to provide a dispersant for gypsum muds whereby the water retention properties of such muds are markedly improved and wherein satisfactory viscosities and gel strengths may be maintained.

Another object is to provide a well drilling gypsum mud having good water retention properties, and satisfactory viscosity and gel strength characteristics.

The present invention utilizes as the base material in the production of the dispersant a sodium base sulphite liquor.

It will be recognized that lignin sulphonates vary to an extremely wide degree in their chemical structures and no effective chemical designation has thus far been developed for identifying the various forms or classifications of these sulphonates. One reason for the lack of success in this regard is the great complexity of the molecule. Native lignins have molecular weights between 800 and 10,000. Another reason is the ease with which the molecule both degrades and polymerizes. Thus, after sulphite cooking, the lignin sulphonates have molecular weights ranging from a few thousands to 2,000,000.

It is well recognized that a lignin sulphonate cannot be described in terms of a chemical composition but rather in terms of its process of production which determines its average physico-chemical structure and the properties of the product.

Since it is possible to prepare an indefinite number of lignin sulphonates having significant differences in physico-chemical properties by varying the starting material and/or process conditions, it is essential, for the purpose of the present invention, that a particular starting material be employed and that specified process conditions be observed.

In accordance with the invention, a dispersant prepared from a sodium base sulphite liquor in somewhat similar manner to that disclosed in United States Patent 2,858,-271, but modified in important degree by the addition of iron sulphate along with alkali metal dichromate, and with a final addition of solid copper sulphate, results in a greatly improved product having particular effectiveness when incorporated in a gypsum drilling mud.

In preparing the sulphite liquor dispersant for the drilling fluid, sodium base sulphite liquor having a solids content of about 50% and a pH preferably of about 7 is heated in a pressure vessel to a temperature of 270 to 300° F., by means of live steam or by means of a heat exchange coil. Air is admitted to the vessel through a sparger at the rate of about 0.5 to 1 cubic foot per minute per gallon of liquor to oxidize the material. A minimum reaction time of about 1 hour is required for best results and at the low air flow rates reaction time up to 3 hours may be necessary. The air oxidation treatment is carried out to maximum degree, i.e., until no further improvement in properties takes place. This oxidation treatment reduces the pH of the liquor and best results are obtained at a final pH of 4 to 4.5. The pH should not be allowed to drop below 3.5 during this treatment.

To the thus oxidized sulphite liquor is then added at least 1% and not more than 25% of alkali metal dichromate and not less than 5% nor more than 25% of an iron sulphate, calculated on the weight of solids in the liquor. The mixture is then concentrated, preferably by spray drying. The drying is carried out immediately to prevent any appreciable reaction of the alkali metal dichromate and iron sulphate with the liquor.

Finally, after drying, a solid copper salt is added to the dried product and thoroughly incorporated therein. The copper salt is added in the proportion of 0.3 to 2.3% expressed as CuO by weight of the product. Copper sulphate is the preferred copper salt but the chloride, nitrate and chromate salts may be used.

The dispersant described is added to a gypsum clay slurry in the proportion of 1 to 10 pounds per barrel of slurry.

The use of a copper salt in the dispersant has been found to reduce greatly the rate of water loss in the mud and at the same time gives markedly better control of viscosity and gel formation. The copper ion appears to be the effective agent in controlling both gel formation and water loss. The copper salt when present in the mud in the proportion of 0.009 to 0.67 lb. (in terms of CuO) per barrel of mud, provides effective control.

The following table gives test results using the dispersant described with varying amounts of copper sulphate in gypsum drilling mud:

Table I

| $CuSO_4 5H_2O$ as percent CuO | Filter Loss, Ml. in 20 mins. | Viscosity | Gels 0-10 min. |
|---|---|---|---|
| Nil | 19.5 | 17 | 0-40 |
| 0.32 | 16.5 | 16 | 0-20 |
| 0.96 | 15 | 12 | 0-15 |
| 1.6 | 14 | 11 | 0-10 |
| 2.24 | 12.5 | 8 | 0-10 |

The following table shows the relative merit of the copper salts when 1.6% expressed as CuO, was employed with the dispersant described:

Table II

| Copper Salt | Water Loss, Ml. in 20 mins. | Viscosity | Gels 0-10 min. |
|---|---|---|---|
| Nil | 16.5 | 14 | 0-20 |
| $CuSO_3 5H_2O$ | 11 | 3 | 0-5 |
| $CuCl_2 . 2H_2O$ | 13 | 8 | 0-5 |
| $CuNO_3 . 3H_2O$ | 11.5 | 3 | 0-5 |
| $CuCr_2O_7 . 2H_2O$ | 12 | 3 | 0-5 |

It is extremely important that the copper salt be added as a solid to the dried product.

A base mud consisting of a 7% aqueous concentration of bentonite was used in the tests to which Tables I and II relate. A dispersant or thinner at the rate of 3 pounds per barrel of drilling fluid was added along with the copper salt, the pH was adjusted to 8.5 with sodium hydroxide and 3 pounds of gypsum per barrel were added to the mixture. Tests were made after thorough agitation in accordance with standard methods of the American Petroleum Institute.

The following table illustrates the comparative effectiveness of employing (1) a dispersant as described but without the addition of a copper salt, (2) a dispersant as described but wherein the copper salt was added in solution before drying, and (3) a dispersant as described and having a copper salt dry powder added to the dry product.

Table III

| | pH | R.p.m. | | PV | YP | Gels | | Fluid Loss |
|---|---|---|---|---|---|---|---|---|
| | | 600 | 300 | | | 0 | 10 | |
| 1. No $CuSO_4$ added | 9.1 | 23 | 19 | 14 | 5 | 2 | 30 | 20.6 |
| 2. 5% $CuSO_4 . 5H_2O$ added in solution before spray drying | 9.1 | 33 | 19 | 14 | 5 | 2 | 28 | 20.8 |
| 3. 5% $CuSO_4 . 5H_2O$ added as a dry powder | 9.1 | 30 | 17 | 13 | 4 | 0 | 26 | 19.0 |

It will be observed that copper sulphate added in solution produces no improvement, whereas when added as a dry powder it improves all the properties. When the mixture is added to a mud, the copper sulphate may modify the mud rather than the lignin sulphonate.

The base mud employed in Table III consisted of a 34% simulated field mud. The composition of the solids in the mud was 10 parts Tennessee Ball clay, 4 parts Dixie Bond clay, and 1 part commercial Wyoming bentonite.

We claim:

1. A dispersant for well drilling muds consisting essentially of dried lignin sulphonate containing 5 to 25% by weight of alkali metal dichromate, 5 to 25% by weight of iron sulphate and 0.3 to 2.3% expressed as CuO by weight of dry powder of a copper salt selected from the group consisting of copper sulfate, copper chloride, copper nitrate and copper chromate, and obtained by the following successive steps in order:

(a) heating sodium base sulphite liquor having a pH of about 7 in a closed zone at a temperature of 270 to 300° F., (b) passing air into the hot liquor at the rate of about 0.5 to 1 cubic foot per minute per gallon of liquor for more than one hour to oxidize the material therein to maximum degree and reduce the pH of the liquor to 4-4.5, (c) mixing with the liquor 5 to 25% of its solids content by weight of alkali metal dichromate and 5 to 25% of its solids content by weight of iron sulphate, (d) immediately after said additions of alkali metal dichromate and iron sulphate, and substantially before reaction of said alkali metal dichromate and iron sulphate with components of said liquor, drying the resulting mixture, (e) adding to the dry product of (d) 0.3 to 2.3% expressed as CuO of dry copper salt powder.

2. A method of preparing a dispersant for well drilling muds which comprises the following successive steps in order:

(a) heating sodium base sulphite liquor having a pH of about 7 in a closed zone at a temperature of 270 to 300° F., (b) passing air into the hot liquor at the rate of about 0.5 to 1 cubic foot per minute per gallon of liquor for more than one hour to oxidize the material therein to maximum degree and reduce the pH of the liquor to 4-4.5, (c) mixing with the liquor 5 to 25% of its solids content by weight of alkali metal dichromate and 5 to 25% of its solids content by weight of iron sulphate, (d) immediately after said additions of alkali metal dichromate and iron sulphate, and substantially before reaction of said alkali metal dichromate and iron sulphate with components of said liquor, drying the resulting mixture, (e) adding to the dry product of (d) 0.3 to 2.3% expressed as CuO of dry powder of a copper salt selected from the group consisting of copper sulfate, copper chloride, copper nitrate and copper chromate.

3. A well drilling fluid consisting essentially of an aqueous slurry of sodium bentonite containing gypsum and 1 to 10 pounds per barrel of a dispersant consisting essentially of dried lignin sulphonate containing 5 to 25% by weight of alkali metal dichromate, 5 to 25% by weight of iron sulphate and 0.3 to 2.3% expressed as CuO by weight of dry powder of a copper salt selected from the group consisting of copper sulfate, copper chloride, copper nitrate and copper chromate, and obtained by the following successive steps in order:

(a) heating sodium base sulphite liquor having a pH of about 7 in a closed zone at a temperature of 270 to 300° F., (b) passing air into the hot liquor at the rate of about 0.5 to 1 cubic foot per minute per gallon of liquor for more than one hour to oxidize the material therein to maximum degree and reduce the pH of the liquor to 4-4.5, (c) mixing with the liquor 5 to 25% of its solids content by weight of alkali metal dichromate and 5 to 25% of its solids content by weight of iron sulphate, (d) immediately after said additions of alkali metal dichromate and iron sulphate, substantially before reaction of said alkali metal dichromate and iron sulphate with components of said liquor, drying the resulting mixture, (e) adding to the dry product of (d) 0.3 to 2.3% expressed as CuO of dry copper salt powder.

References Cited in the file of this patent

UNITED STATES PATENTS

| | | |
|---|---|---|
| 2,605,221 | Hoeppel | July 29, 1952 |
| 2,858,271 | Byrd | Oct. 28, 1958 |
| 2,935,504 | King et al. | May 3, 1960 |